「(12) United States Patent
Ishii et al.

(10) Patent No.: US 8,576,289 B2
(45) Date of Patent: Nov. 5, 2013

(54) BLUR CORRECTION DEVICE AND BLUR CORRECTION METHOD

(75) Inventors: Yasunori Ishii, Osaka (JP); Yusuke Monobe, Kyoto (JP); Yasushi Yagi, Hyogo (JP); Yasuhiro Mukaigawa, Osaka (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 13/377,038

(22) PCT Filed: Mar. 17, 2011

(86) PCT No.: PCT/JP2011/001577
§ 371 (c)(1),
(2), (4) Date: Dec. 8, 2011

(87) PCT Pub. No.: WO2011/129055
PCT Pub. Date: Oct. 20, 2011

(65) Prior Publication Data
US 2012/0086822 A1  Apr. 12, 2012

(30) Foreign Application Priority Data
Apr. 13, 2010 (JP) ................. 2010-092668

(51) Int. Cl.
*H04N 5/228* (2006.01)

(52) U.S. Cl.
USPC ............. 348/208.6; 348/208.4; 348/208.5

(58) Field of Classification Search
None
See application file for complete search history.

(56) References Cited

U.S. PATENT DOCUMENTS

| 8,049,783 B2 | 11/2011 | Hatanaka |
| 2008/0259170 A1* | 10/2008 | Hatanaka ............ 348/208.6 |
| 2009/0179995 A1* | 7/2009 | Fukumoto et al. ...... 348/208.6 |
| 2010/0231731 A1* | 9/2010 | Motomura et al. ...... 348/208.4 |

(Continued)

FOREIGN PATENT DOCUMENTS

| JP | 11-24122 | 1/1999 |
| JP | 2005-100144 | 4/2005 |
| JP | 2006-155063 | 6/2006 |
| JP | 2006-279807 | 10/2006 |

(Continued)

OTHER PUBLICATIONS

International Search Report issued Apr. 12, 2011 in International (PCT) Application No. PCT/JP2011/001577.

(Continued)

*Primary Examiner* — Lin Ye
*Assistant Examiner* — John H Morehead, III
(74) *Attorney, Agent, or Firm* — Wenderoth, Lind & Ponack, LLP

(57) ABSTRACT

Blur correction device (100) includes: a blur information generation unit (203) which generates blur information based on sensor data indicating camera motion; a blur correction unit (204) which corrects blur in a captured image, based on the blur information, to generate a candidate corrected image; an evaluation value calculation unit (205) which calculates an evaluation value indicating a blur correction level for the candidate corrected image; a termination judgment unit (206) which judges whether the blur correction should be terminated, based on a predetermined condition; and a blur information updating unit which updates the blur information, when the blur correction should not be terminated. When the blur information is updated, the blur correction unit (204) corrects the blur, based on the updated blur information, to generate a new candidate corrected image. When the blur correction should be terminated, the termination judgment unit (206) determines the corrected image from the candidate corrected images, based on the evaluation value.

15 Claims, 10 Drawing Sheets

(56) References Cited

U.S. PATENT DOCUMENTS

2010/0321510 A1* 12/2010 Tsutsumi ............... 348/208.4
2012/0224031 A1* 9/2012 Yamanaka et al. ........... 348/47
2012/0262589 A1* 10/2012 Torii ...................... 348/208.4

FOREIGN PATENT DOCUMENTS

| | | |
|---|---|---|
| JP | 2008-271245 | 11/2008 |
| JP | 2009-63896 | 3/2009 |

OTHER PUBLICATIONS

Qi Shan et al. "*High-quality Motion Deblurring from a Single Image*", ACM Transactions on Graphics, vol. 27, No. 3, Article 73, Aug. 2008.

Ramesh Raskar et al., "*Coded Exposure Photography: Motion Deblurring using Fluttered Shutter*", SIGGRAPH 2006, ACM Trans. Graph., vol. 25, No. 3, pp. 795-804, Jul. 2006.

\* cited by examiner (a)

(b)

Captured image

||

Sharp image

Convolution operation

Point spread function (PSF)

BLUR CORRECTION DEVICE AND BLUR CORRECTION METHOD

TECHNICAL FIELD

The present invention relates to a blur correction device and a blur correction method which correct blur occurring in a captured image in a camera that captures a still image.

BACKGROUND ART

Blur correction techniques are techniques for detecting blur which occurs when a still image is captured, and reducing the blur occurring within the captured image by correction based on the detected amount of blur.

As methods of detecting blur, there are methods using a motion detection sensor (for example, an angular rate sensor such as a gyroscope, or an acceleration sensor, and so on) provided in the camera or methods involving detection by analyzing a captured image. Furthermore, optical correction or sensor shift correction in which blur is corrected by controlling the position of a lens or imaging device at the time of image-capturing as well as electronic correction in which blur is electronically corrected through image processing after image-capturing are available as methods of correcting blur.

In most optical correction or sensor shift correction methods, the occurrence of blur in a captured image is reduced by detecting the trajectory of blur at the time of image-capturing, using an angular rate sensor, and controlling the position of the lens or imaging device so as to cancel out the blur in the detected trajectory.

Meanwhile, a method of estimating a trajectory of blur by analyzing a captured image, and correcting the captured image into a blur-free image through image processing based on the estimated blur trajectory has been proposed (for example, see Non-Patent Literature 1 (NPL 1)). In the technique disclosed in NPL 1, the estimation of the trajectory of blur and the correction to a blur-free image are performed iteratively, using statistical information such as characteristics of a blur-free natural image or a property that should be satisfied by a flat region, thereby gradually bringing both the blur trajectory and the corrected image closer a desired result.

The principle for the occurrence of blur in a captured image and the principle behind the method of correcting blur through image processing after image-capturing shall be described with reference to FIG. 11. The occurrence of blur in a captured image is caused when a beam of light, which should have been image-captured by only one pixel when blur does not occur, is also distributed and captured by neighboring pixels.

Here, i (x, y) denotes a sharp image that is captured when blur does not occur (hereafter called "sharp image"). Furthermore, j (x, y) denotes a captured image in which blur has occurred. Furthermore, p (x, y) denotes a distribution function of a point image (point spread function (PSF)) when a light beam that should have been image-captured by only one pixel when blur does not occur also spreads to and is captured by neighboring pixels due to blurring. In this case, the relationship in Equation (1) below is true among i (x, y), j (x, y), and p (x, y).

[Math. 1]

$$j(x, y) = i(x, y) \otimes p(x, y) \quad \text{Equation (1)}$$

Here, the symbol indicated below denotes a convolution operation, and (x, y) denotes a pixel position.

[Math. 2]

$$\otimes$$

In addition, when the values of respective frequency components obtained when Fourier transform is performed on i (x, y), j (x, y), and p (x, y) are denoted as I (m, n), J (m, n), and P (m, n), the relationship in Equation (2) below is true among such values.

[Math. 3]

$$J(u,v) = I(u,v) \times P(u,v) \quad \text{Equation (2)}$$

Here, (u, v) denotes the order of the frequency component. In this manner, on the frequency domain, the captured image is expressed by the product of the sharp image and the PSF. Inversely, if the PSF can be estimated by analyzing the captured image, the estimation result of a sharp image (hereafter called "corrected image") can be calculated by dividing the captured image by the PSF on the frequency domain.

Furthermore, Patent Literature 1 (PTL 1) discloses a method of obtaining blur information using an angular rate sensor and performing correction processing. With this method, the PSF can be obtained without estimating the PSF from the captured image.

In addition, Patent Literature 2 (PTL 2) discloses a method of calculating PSF from angular rate data obtained through an angular rate sensor then generating an inverse filter from the PSF, and applying correction processing to a captured image. In this method, a smoothing unit which performs smoothing on the PSF and a control unit which controls the smoothing intensity of the smoothing unit according to the state of focus are provided, and thus it is possible to correct not only blur but also defocusing-related picture quality deterioration.

CITATION LIST

Patent Literature

[PTL 1] Japanese Unexamined Patent Application Publication No. 2011-24122
[PTL 2] Unexamined Japanese Patent Application Publication No. 2006-279807

Non Patent Literature

[NPL 1] "High-quality Motion Deblurring from a Single Image", Qi Shan, Jiaya Jia, Aseem Agarwala, SIGGRAPH 2008

SUMMARY OF INVENTION

Technical Problem

PTL 1 and 2 describe, as a problem, performing correction processing by directly using the blur information obtained through an angular rate sensor. Since the output of the angular rate sensor includes various errors such as attachment error, scale factor error, drift, linearity error, resolution limitation, temperature characteristic error, and so on, there is the problem that an accurate corrected image cannot be obtained using the methods in PTL 1 and 2.

Furthermore, in the technique disclosed in NPL 1, PSF is estimated from the captured image, and thus there are also cases where PSF accuracy is reduced.

In view of this, the present invention is conceived in order to solve the aforementioned problems and has as an object to provide a blur correction device that is capable of accurately correcting blur occurring in a captured image.

Solution to Problem

In order to achieve the aforementioned object, the blur correction device according to an aspect of the present invention is a blur correction device that electronically corrects blur occurring in an image captured using a camera to generate a corrected image from the captured image, the blur correction device including: a blur information generation unit configured to generate blur information for correcting the blur occurring in the captured image, based on sensor data indicating motion of the camera, the sensor data being detected using a motion detection sensor during the image-capturing of the captured image; a blur correction unit configured to correct the blur occurring in the captured image, based on the blur information generated by the blur information generation unit, to generate a candidate corrected image; an evaluation value calculation unit configured to calculate an evaluation value which is an evaluation value for the candidate corrected image generated by the blur correction unit and indicates a blur correction level; a termination judgment unit configured to judge whether or not the blur correction should be terminated, based on a predetermined condition; and a blur information updating unit configured to update the blur information generated by the blur information generation unit, when the termination judgment unit judges that the blur correction should not be terminated, wherein, when the blur information is updated by the blur information updating unit, the blur correction unit is configured to correct the blur occurring in the captured image, based on the updated blur information, to generate a new candidate corrected image, and upon judging that the blur correction should be terminated, the termination judgment unit is configured to determine the corrected image from the at least one candidate corrected images generated by the blur correction unit, based on the evaluation value calculated by the evaluation value calculation unit.

According to this configuration, a corrected image having a high blur correction level can be generated by updating the blur information based on sensor data detected using a motion detection sensor. In other words, blur occurring in a captured image can be corrected with high accuracy.

Furthermore, it is preferable that the blur information be represented by a line segment group made up of at least one line segment.

According to this configuration, blur information can be expressed using a small amount of information and associating the blur information with the sensor data detected using a motion detection sensor is facilitated.

Furthermore, it is preferable that the blur information updating unit updates the blur information by changing a position of at least one endpoint of at least one line segment making up the line segment group representing the blur information.

According to this configuration, the blur information can be easily updated by changing the position of an endpoint of a line segment making up the line segment group.

Furthermore, it is preferable that the blur information updating unit changes the position of the endpoint within a region having, as a center, a position obtained from the sensor data and indicating an image-capturing direction and a size according to a detection capability of the motion detection sensor.

According to this configuration, it is possible to prevent the updating of the blur information up to an unnecessary extent, and thus the blur information can be updated efficiently.

Furthermore, it is preferable that the blur information generation unit generates the blur information represented by the line segment group, by calculating, as a trajectory of the blur, the line segment group in which positions, each of which is obtained from the sensor data and indicates an image-capturing direction at a corresponding one of plural times, are chronologically connected by a straight line, and calculating, as an amount of light, at each point making up the calculated line segment group, a value that is inversely proportional to motion velocity at the position indicating the image-capturing direction.

According to this configuration, it becomes possible to generate more accurate blur information based on sensor data.

Furthermore, it is preferable that the camera includes an exposure control unit which controls plural iterations of opening and closing of a shutter during the image-capturing of the captured image, and that the blur information generation unit be further configured to extract parts of the line segment group which indicate positions indicating the image-capturing direction while the shutter is open, and generate the blur information represented by the extracted parts.

According to this configuration, blur can be corrected accurately in a captured image obtained by exposure coding.

Furthermore, it is preferable that the termination judgment unit be configured to judge whether or not the blur correction should be terminated, based on whether or not the evaluation value calculated by the evaluation value calculation unit satisfies a predetermined condition.

According to this configuration, the blur correction can be terminated when a candidate corrected image having a high blur correction level is generated, and thus blur correction can be performed efficiently.

Furthermore, it is preferable that the evaluation value calculation unit be configured to calculate the evaluation value such that the blur correction level increases as a sum of difference values between pixel values of neighboring pixels in the candidate corrected image increases.

According to this configuration, a candidate corrected image having sharp edges can be determined as the corrected image, and thus blur can be corrected accurately.

Furthermore, it is preferable that the evaluation value calculation unit be configured to calculate the evaluation value such that the blur correction level increases as variation in pixel values is kept flat in a region which is in the candidate corrected image and which corresponds to a region in the captured image in which variation in pixel values is flat.

According to this configuration, a candidate corrected image for which ringing is suppressed can be determined as the corrected image, and thus blur can be corrected accurately.

Furthermore, it is preferable that the motion detection sensor be an angular rate sensor.

According to this configuration, motion detection for blur can be performed easily.

Furthermore, it is preferable that the blur information indicates a point spread function.

According to this configuration, blur correction can be performed easily.

Furthermore, it is preferable that the blur correction unit be configured to convert the captured image and the point spread function indicated by the blur information, from a spatial domain to a frequency domain, divide the captured image by the point spread function after the conversion, and convert a result of the division, from the frequency domain to the spatial domain, to generate the candidate corrected image.

According to this configuration, blur correction can be performed easily.

Furthermore, the integrated circuit according to an aspect of the present invention is an integrated circuit that electronically corrects blur occurring in an image captured using a camera to generate a corrected image from the captured image, the blur correction device including: a blur information generation unit configured to generate blur information for correcting the blur occurring in the captured image, based on sensor data indicating motion of the camera, the sensor data being detected using a motion detection sensor during the image-capturing of the captured image; a blur correction unit configured to correct the blur occurring in the captured image, based on the blur information generated by the blur information generation unit, to generate a candidate corrected image; an evaluation value calculation unit configured to calculate an evaluation value which is an evaluation value for the candidate corrected image generated by the blur correction unit and indicates a blur correction level; a termination judgment unit configured to judge whether or not the blur correction should be terminated, based on a predetermined condition; and a blur information updating unit configured to update the blur information generated by the blur information generation unit, when the termination judgment unit judges that the blur correction should not be terminated, wherein, when the blur information is updated by the blur information updating unit, the blur correction unit is configured to correct the blur occurring in the captured image, based on the updated blur information, to generate a new candidate corrected image, and upon judging that the blur correction should be terminated, the termination judgment unit is configured to determine the corrected image from the at least one candidate corrected images generated by the blur correction unit, based on the evaluation value calculated by the evaluation value calculation unit.

According to this configuration, the same advantageous as the above-described blur correction device can be produced.

Furthermore, the blur correction method according to an aspect of the present invention is a blur correction method of electronically correcting blur occurring in an image captured using a camera to generate a corrected image from the captured image, the blur correction method including: generating blur information for correcting the blur occurring in the captured image, based on sensor data indicating motion of the camera, the sensor data being detected using a motion detection sensor during the image-capturing of the captured image; correcting the blur occurring in the captured image, based on the blur information generated in the generating, to generate a candidate corrected image; calculating an evaluation value which is an evaluation value for the candidate corrected image generated in the correcting and indicates a blur correction level; judging whether or not the blur correction should be terminated, based on a predetermined condition; and updating the blur information generated in the generating, when it is judged in the judging that the blur correction should not be terminated, wherein in the correcting, when the blur information is updated in the updating, the blur occurring in the captured image is corrected based on the updated blur information to generate a new candidate corrected image, and in the judging, when it is judged that the blur correction should be terminated, the corrected image is determined from the at least one candidate corrected images generated in the correcting, based on the evaluation value calculated in the calculating.

According to this configuration, the same advantageous effect as the above-described blur correction device can be produced.

Furthermore, the present invention can also be implemented as a program for causing a computer to execute the respective steps included in the blur correction method. In addition, it goes without saying that such a program can be distributed via a recording medium such as a CD-ROM and via a transmission medium such as the Internet.

Advantageous Effects of Invention

As is clear from the forgoing description, the blur correction device according to an aspect of the present invention is capable of generating a corrected image having a high blur correction level, by updating blur information based on sensor data detected using a motion detection sensor. In other words, blur occurring in a captured image can be corrected with high accuracy.

DESCRIPTION OF EMBODIMENTS

Hereinafter, embodiments of the present invention shall be described with reference to the Drawings.

Embodiment 1

Figure 1:
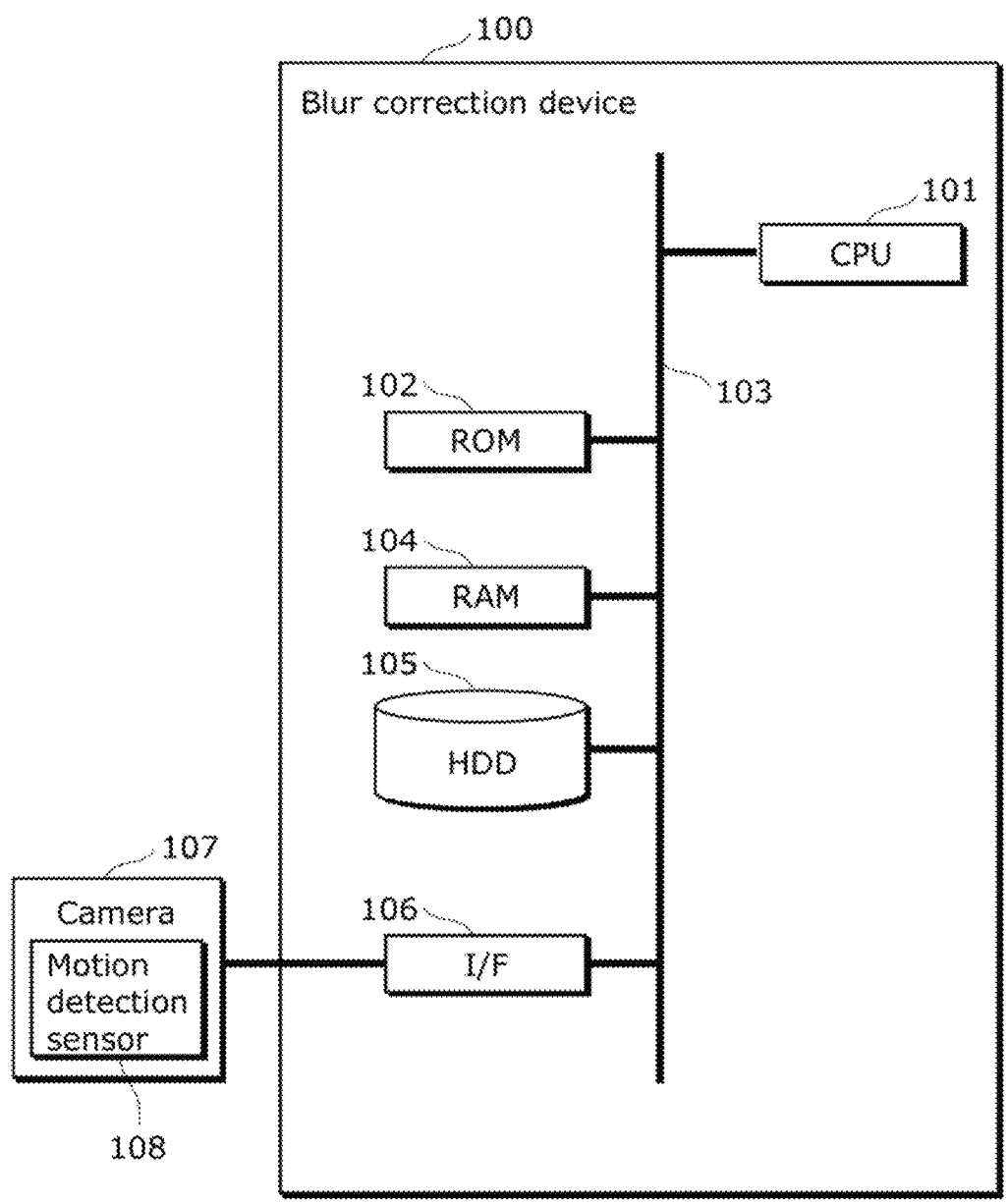
FIG. 1 is a hardware configuration diagram for a blur correction device in Embodiment 1 of the present invention.

First, a hardware configuration of a blur correction device in the present embodiment shall be described using FIG. 1.

FIG. 1 is a hardware configuration diagram for a blur correction device in Embodiment 1 of the present invention. As shown in FIG. 1, a blur correction device 100 includes a CPU (Central Processing Unit) 101, a ROM (Read Only Memory) 102, a bus 103, RAM (Random Access Memory) 104, an HDD (Hard Disk Drive) 105, and an I/F (interface) 106.

The CPU 101 loads a program stored in the ROM 102 into the RAM 104 via the bus 103, and executes the loaded program.

The RAM 104 and the HDD 105 are used as an image storage area and so on for temporarily storing a captured image. Furthermore, the RAM 104 and the HDD 105 are used as a temporary storage area required for each process executed by the CPU 101.

The I/F 106 receives inputs of a captured image and sensor data from a camera 107.

The camera 107 includes a motion detection sensor 108 in addition to a lens, an imaging device, and a timer which are not illustrated. The motion detection sensor 108 detects the motion of the camera 107. Specifically, the motion detection sensor 108 is, for example, an angular rate sensor such as a gyroscope, or an acceleration sensor. In addition, the camera 107 outputs sensor data together with a captured image, to the blur correction device 100. Here, sensor data indicates the motion of the camera 107 detected by the motion detection sensor 108 during the image-capturing of the captured image.

Figure 2:
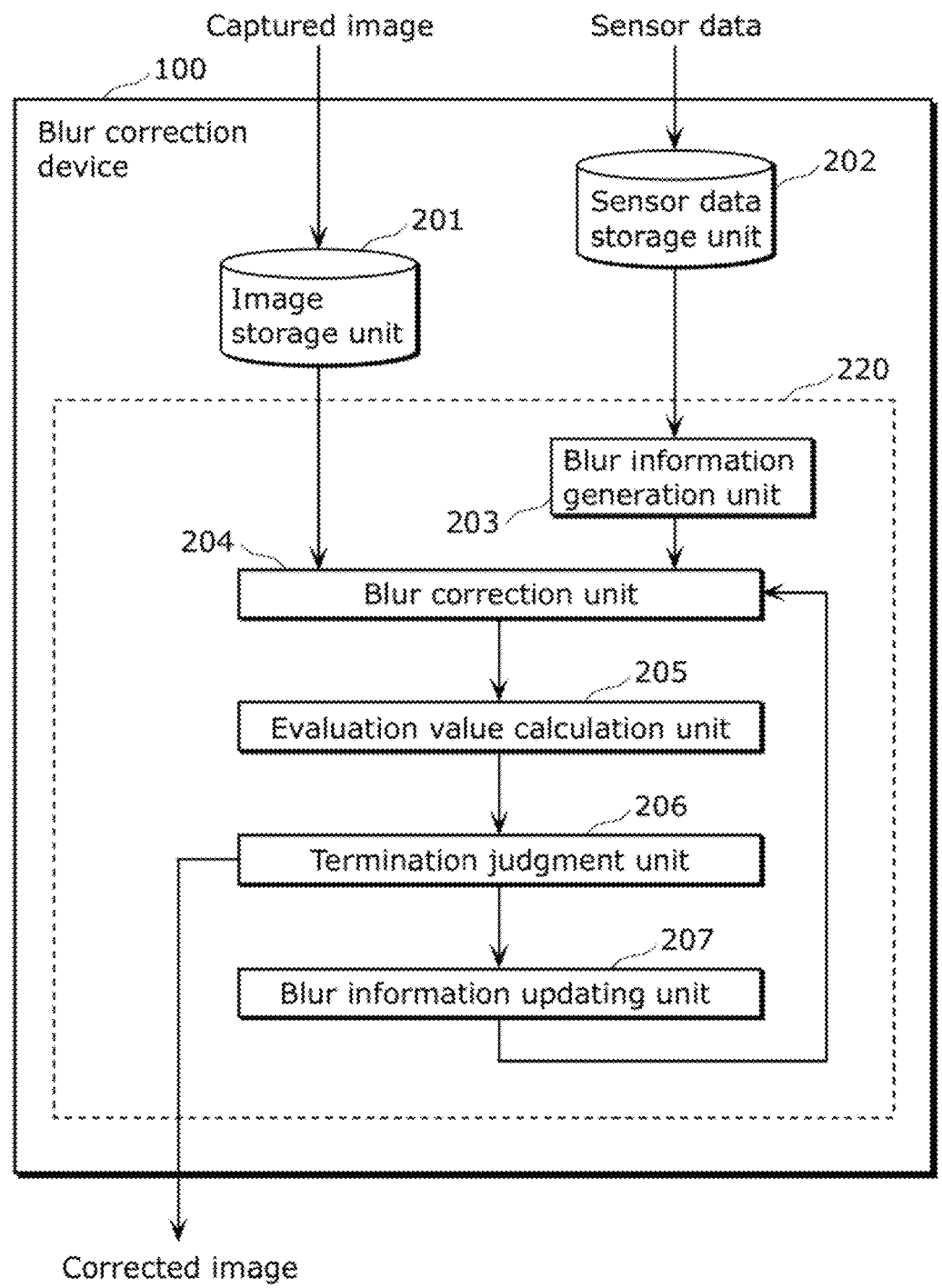
FIG. 2 is a block diagram showing a functional configuration of the blur correction device in Embodiment 1 of the present invention.

Next, a functional configuration of the blur correction device in the present embodiment shall be described using FIG. 2.

FIG. 2 is a block diagram showing the functional configuration of the blur correction device in Embodiment 1 of the present invention. Specifically, FIG. 2 is a block diagram showing the configuration of the functions of the blur correction device which are realized through the hardware configuration shown in FIG. 1.

The blur correction device 100 electronically corrects blur occurring in a captured image, which is image-captured by the camera 107, to thereby generate a corrected image from the captured image.

As shown in FIG. 2, the blur correction device 100 includes an image storage unit 201, a sensor data storage unit 202, a blur information generation unit 203, a blur correction unit 204, an evaluation value calculation unit 205, a termination judgment unit 206, and a blur information updating unit 207.

The image storage unit 201 corresponds to the RAM 104 or the HDD 105, and stores therein a captured image taken by the camera 107.

The sensor data storage unit 202 corresponds to the RAM 104 or the HDD 105, and stores therein sensor data indicating motion of the camera 107. Specifically, sensor data indicates a change in the image-capturing direction during a period in which the captured image stored in the image storage unit 201 was taken (during the exposure period). More specifically, the sensor data is, for example, angular rate data detected for each predetermined time interval during the exposure period.

The blur information generation unit 203 is a processing unit realized through the CPU 101, the RAM 104, and so on. The blur information generation unit 203 generates, based on the sensor data, blur information for correcting the blur in the captured image. Specifically, the blur information generation unit 203 generates, based on the sensor data, blur information indicating, for example, the trajectory of the blur and the distribution of the amount of light on the blur trajectory.

The blur correction unit 204 is a processing unit realized through the CPU 101, the RAM 104, and so on. The blur correction unit 204 generates a candidate corrected image by correcting the blur in the captured image based on the generated blur information. In other words, the blur correction unit 204 reduces the blur in the captured image, using the blur information. Specifically, the blur correction unit 204 electronically corrects the captured image using the blur information so that a blurred image which is the captured image becomes a sharp image.

Furthermore, when the blur information is updated by the blur information updating unit 207, the blur correction unit 204 generates a new candidate corrected image by correcting the blur in the captured image based on the updated blur information.

The evaluation value calculation unit 205 is a processing unit realized through the CPU 101, the RAM 104, and so on. The evaluation value calculation unit 205 calculates an evaluation value which is an evaluation value for a generated candidate corrected image and indicates a blur correction level.

Here, the blur correction level indicates the level of reduction in the blur in the captured image. Stated differently, the blur correction level indicates closeness to a blur-free image.

The termination judgment unit 206 is a processing unit realized through the CPU 101, the RAM 104, and so on. The termination judgment unit 206 judges whether or not the blur correction should be terminated, based on a predetermined condition. Specifically, the termination judgment unit 206 judges whether or not the blur correction should be terminated, based on, for example, whether or not the calculated evaluation value satisfies the predetermined condition. Furthermore, for example, the termination judgment unit 206 may judge whether or not the blur correction should be terminated, based on whether or not the number of times the updating of the blur information has been performed is equal to or greater than a predetermined number of times.

In addition, when the termination judgment unit 206 judges that the blur correction should be terminated, the termination judgment unit 206 determines, based on the calculated evaluation value, the corrected image from among at least one candidate corrected image that is generated. Specifically, for example, the termination judgment unit 206 determines, as the corrected image, a candidate corrected image for which the highest evaluation value is calculated.

The blur information updating unit 207 is a processing unit realized through the CPU 101, the RAM 104, and so on. The blur information updating unit 207 updates the blur information generated by the blur information generation unit 203, when the termination judgment unit 206 judges that the blur correction should not be terminated. Specifically, for example, blur information updating unit 207 updates the blur information by changing the blur trajectory indicated by the blur information generated by the blur information generation unit 203.

Next, the various operations of the blur correction device 100 configured in the above-described manner shall be described in detail. It should be noted that the subsequent description describes the case where the sensor data is angular rate data.

Figure 3:
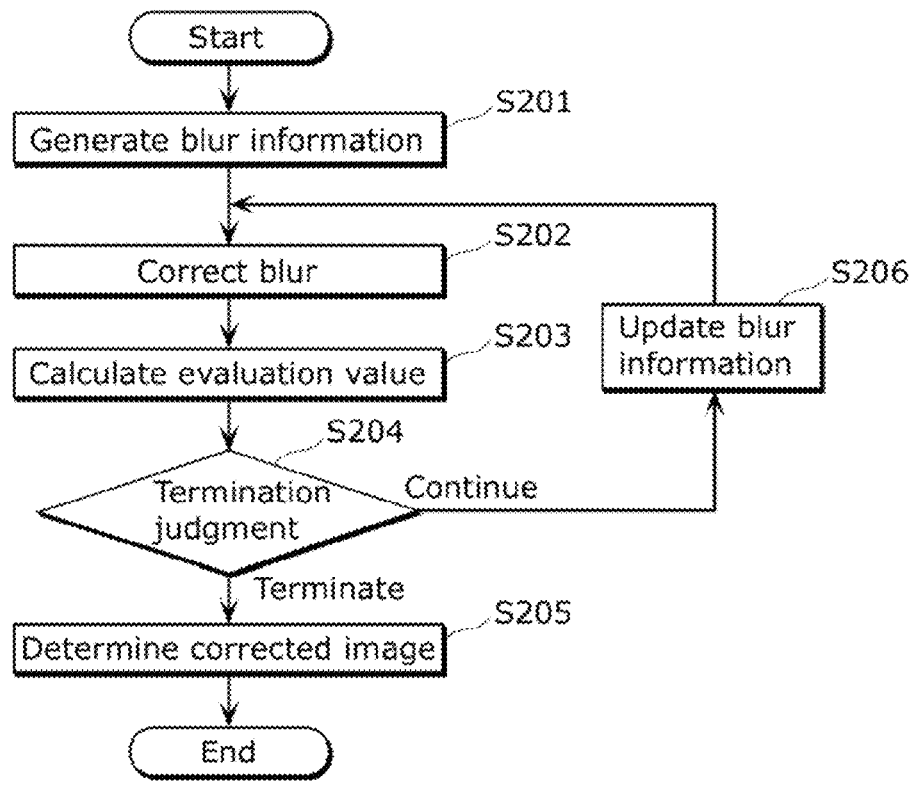
FIG. 3 is a flowchart showing the flow of a blur correction process in Embodiment 1 of the present invention.

FIG. 3 is a flowchart showing the flow of the blur correction process in Embodiment 1 of the present invention.

The blur correction process shown in FIG. 3 is performed in the state described below. First, a captured image taken using the camera 107 in FIG. 1 is stored in the image storage unit 201. Furthermore, angular rate data for the camera 107 at the time of image-capturing, detected using the angular rate sensor is also stored in the sensor data storage unit 202. Here, the detected angular rate data indicates, for example, a motion vector regarding the image-capturing direction of the camera, which is sampled for each predetermined time interval T.

In such a state, first, the blur information generation unit 203 reads the angular rate data stored in the sensor data storage unit 202, and generates blur information from the read angular data (S201). Hereinafter, details of the blur information generation process in step S201 shall be described using FIG. 4.

Figure 4:
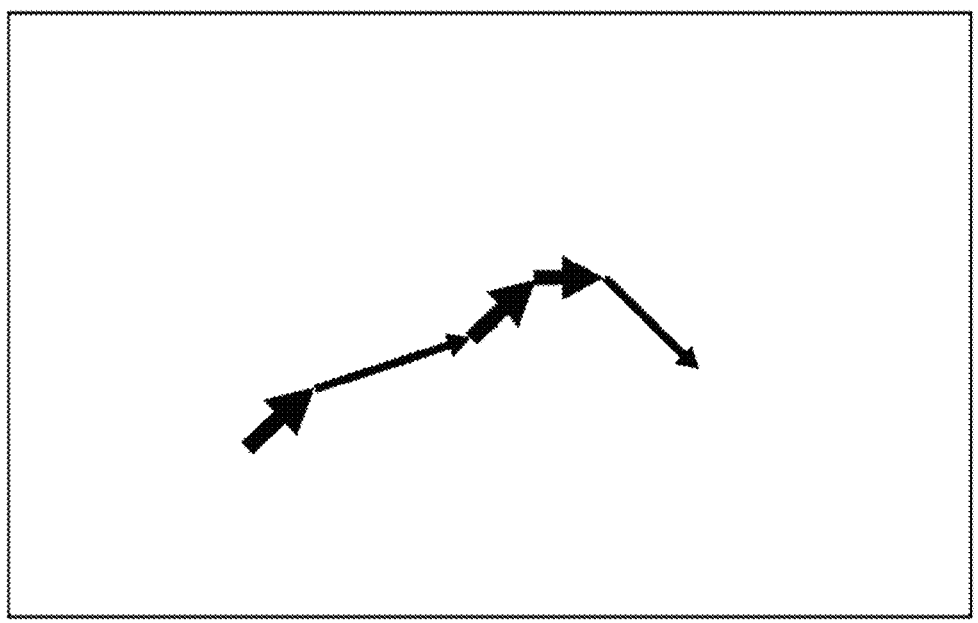
FIG. 4 is a diagram for describing a blur information generation process in Embodiment 1 of the present invention.

FIG. 4 is a diagram for describing a blur information generation process in Embodiment 1 of the present invention. Specifically, FIG. 4 is a diagram in which angular rate data represented as motion vectors are sequentially connected and shown on a two-dimensional space.

In FIG. 4, the changes in the image-capturing direction per time interval T are each shown as a line segment. Therefore, by linking the endpoints of the respective line segments, it is possible to show the changes in the image-capturing direction during the exposure period. Here, the thickness of each line segment denotes, in inverse-proportion, motion velocity. In other words, a line segment is narrow when the amount of motion during a time interval T is large, and a line segment is thick when the amount of motion is small.

The line segment group shown in the above manner represents a blur trajectory indicating positions of plural pixels when light, which should have been collected at one point (one pixel) when blur does not occur, is spread and collected in the plural pixels due to the occurrence of blur. Furthermore, the thickness of each line segment denotes the amount of light collected by pixels on such line segment.

Therefore, distribution information indicating values each proportional to the thickness of a line segment included in the line segment group shown in FIG. 4 is equivalent to PSF which indicates blur.

In view of this, the blur information generation unit 203 generates, as blur information, information equivalent to the line segment group shown in FIG. 4. Specifically, the blur information generation unit 203 calculates, as the blur trajectory, the line segment group in which positions obtained from the sensor data and indicating the image-capturing directions at plural times are chronologically connected. In addition, the blur information generation unit 203 calculates, as the amount of light, at each point making up the calculated line segment group, a value that is inversely proportional to the motion velocity at a position indicating image-capturing direction. In addition, the blur information generation unit 203 generates, as blur information, the PSF indicated by the blur trajectory calculated in the above-described manner and the distribution of the amount of light on the blur trajectory.

However, when generating the blur information, the blur information generation unit 203 needs to normalize the value indicating the amount of light at each point so that the total of the values for the respective points making up the line segment group is 1. Specifically, when the line segment corresponding to a k-th time interval T is denoted as $line_k$ and the length of such line segment is denoted as $length(line_k)$, a value P indicating the amount of light for a point on the k-th line segment can be calculated using Equation (3) below. However, N denotes the sum total of the line segments.

[Math. 4]

$$P = \frac{1}{N \times T \times length(line_k)} \qquad \text{Eqaution (3)}$$

Here, when the blur trajectory passes through one point multiple times, the blur information generation unit 203 performs value normalization so that the value of that one point is a total of the values of the points of plural line segments.

As described above, the blur information generation unit 203 generates, based on the sensor data, blur information for correcting the blur in the captured image.

It should be noted that although the blur information calculated in the above-described method is represented by a line segment group, the blur information generation unit 203 may, in order to recreate a smooth blur trajectory, generate blur information represented by a curved line, by smoothly connecting the endpoints of the respective line segments using an interpolation operation such as spline interpolation. At this time, it is preferable that the blur information generation unit 203 also calculate the value of each point using interpolation so that the values change in a continuous manner. Specifically, the blur information generation unit 203 calculates the value of a point on each of line segment according to Equation (3), and treats the calculated value as a representative value with respect to the center point of that line segment. Then, the blur information generation unit 203 can calculate the value of another point that is other than the center point, by interpolating the value according to the distance of the other point from the center point. However, in this case, the blur information generation unit 203 needs to perform normalization on the values indicating the amount of light again so that the total of the final values of the respective points is 1.

In addition, in the present method, the blur information generation unit 203 is capable of calculating the blur information with consideration to blurring and at the same time defocusing occurring when the focus position deviates from the subject. Defocusing can be approximately represented using a Gaussian filter shown in Equation (4).

[Math. 5]

$$h(x, y) = \frac{1}{\sqrt{2\pi\sigma^2}} e^{-\frac{x^2+y^2}{2\sigma^2}} \qquad \text{Eqaution (4)}$$

Here, σ denotes the standard deviation of the Gaussian filter. Furthermore, the range of neighboring pixels for which the filtering process is to be applied is limited to a finite region. The blur information generation unit 203 can generate the blur information for when defocusing occurs together with blurring, by applying Equation (4) to the line segment group representing the blur trajectory or to the smooth curved line into which the line segment group is transformed through an interpolation operation such as spline interpolation.

Description shall return to the flowchart in FIG. 3.

Next, the blur correction unit 204 generates a candidate corrected image by correcting the blur in the captured image stored in the image storage unit 201, based on the blur information (S202). As shown in Equation (2) the simplest blur correction method is a method in which a corrected image is obtained by performing Fourier transform on the captured image and the PSF and then performing a division operation with the captured image and the PSF on the frequency domain.

Therefore, the blur correction unit 204 can generate a candidate corrected image for which blur has been corrected, for example, by converting the captured image and the PSF indicated by the blur information, from the spatial domain to the frequency domain, dividing the captured image by the PSF after the conversion, and converting the result of the division from the frequency domain to the spatial domain.

It should be noted that the method of blur correction is not limited to the above-described method. For example, the blur correction unit 204 may generate a candidate corrected image using a Wiener filter. In this case, the blur correction unit 204 can generate a candidate corrected image even when 0 is included in the frequency component of the PSF.

Next, the evaluation value calculation unit 205 calculates an evaluation value indicating the blur correction level of the calculated candidate correction image (S203). This evaluation value is an index which indicates how successful the correction of the blur is in approaching a sharp image that is obtained when image-capturing is performed without blur. However, since simultaneous image-capturing of both the captured image and the sharp image is not possible, the evaluation value calculation unit 205 cannot directly compare both images to calculate the evaluation value. As such, the evaluation value calculation unit 205 calculates the evaluation value indicating how successfully the candidate correction image has been corrected into a sharp image, based on statistical properties of a large number of sharp images, by setting, as an evaluation index, the degree of matching between such properties and the properties of the candidate corrected image. Specifically, for example, the evaluation value calculation unit 205 calculates an evaluation value E as shown in Equation (5). A smaller value for the evaluation value E is the result of performing better blur correction. In other words, a smaller value for the evaluation value E indicates that the blur correction level is high.

[Math. 6]

$$E = \sum_{x,y} \{l(x, y) \otimes p(x, y) - j(x, y)\}^2 +$$

$$\sum_{x,y} \{|\Phi(\partial_x l(x, y))| + |\Phi(\partial_y l(x, y))|\} +$$

$$\sum_{x,y} \{\partial_x l(x, y) - \partial_x j(x, y)\}^2 \times m(x, y) +$$

$$\sum_{x,y} \{\partial_y l(x, y) - \partial_y j(x, y)\}^2 \times m(x, y)$$

Equation (5)

Here, I (x, y) denotes a candidate corrected image. Furthermore, $\partial x$ and $\partial y$ denote partial differential operations in the x direction and the y direction, respectively.

Furthermore, m (x, y) denotes a mask function for which "1" is assigned for a pixel that is judged to be included in a flat region having little gradation change with neighboring regions in the captured image, and "0" is assigned for a pixel that is judged otherwise. Specifically, m (x, y) becomes "0" when the dispersion of pixel values in a neighboring region of a specific size for a pixel position (x, y) in the captured image is equal to or greater than a predetermined threshold, and becomes "1" when the dispersion is below the predetermined threshold.

Figure 5:
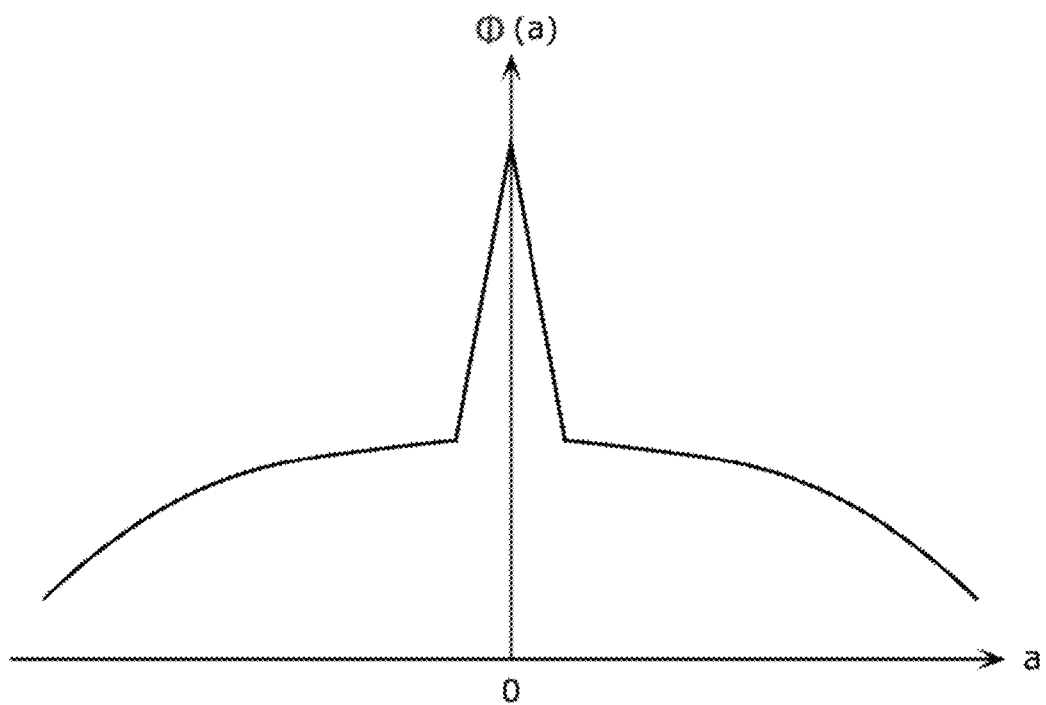
FIG. 5 is an illustration diagram showing function characteristics in a second term of an evaluation function.

Furthermore, ϕ(a) denotes a function called heavy tail such as that shown in FIG. 5, and is a function that takes on a larger value as the absolute value of a decreases.

First, the first term in Equation (5) is an index which indicates the closeness, to the captured image, of an image obtained when convolution operation of the candidate correction image and the PSF is performed. When the value of the first term is large, it means that, as a result derived from the captured image, the combination of the PSF indicated by the blur information and the candidate corrected in image is inappropriate, and that, as a correction result, such combination is undesirable.

The second term is an index which indicates the extent to which the candidate corrected picture has been corrected to a sharp image through blur correction. The second term becomes a smaller value as the absolute value of a value obtained from partial differentiation of the candidate corrected image in the x direction and the y direction increases. At this time, since the absolute value of the value obtained from the partial differentiation increases when the image becomes sharp and contrast at the edges, and so on, increases due to blur correction, the value for the second term becomes smaller, thus indicating that, as a correction result, the candidate corrected image is approaching the desired image.

Specifically, as is clear from the second term, the evaluation value calculation unit 205 calculates the evaluation value such that the blur correction level increases as the sum of difference values of pixel values between adjacent pixels in the candidate corrected image increases. Accordingly, the blur correction device 100 can determine a candidate corrected image having clear edges as the corrected image, and thus accurate correction of blur becomes possible.

The third term and the fourth term are indices for judging whether or not the flat region in the captured image is also kept flat in the candidate corrected image. When blur correction is performed, a side-effect called ringing occurs due to the correction processing in the case where the blur indicated by the PSF does not match the actual blur or in the case where the PSF has a zero point. As a result, a cyclical texture, which does not appear in blur-free image-capturing, is created in the flat region in the image. As such, in the third term and the fourth term, the square of the difference between the partial differential value in the x direction of the candidate correction image and the partial differential value in the x direction of the captured image is calculated, and the square of the difference between the partial difference value in the y direction of the candidate correction image and the partial differential value in the y direction of the captured image is calculated, respectively. Here, the partial differential value in the x direction and the y direction of the captured image is necessarily a small value because it is a partial differential value in the flat region. When a side-effect such as ringing occurs in this region, the partial differential value of the candidate corrected image becomes a large value and thus the calculated values for the third and fourth terms also become large. As a result, the evaluation value becomes large; thus indicating that, as a correction result, the candidate corrected image is undesirable.

Specifically, as is clear from the third term and the fourth term, the evaluation value calculation unit 205 calculates the evaluation value such that the blur correction level increases as the variation in pixel values is also kept flat in a region in the candidate corrected image corresponding to a region in the captured image in which variation of pixel values is flat. Accordingly, the blur correction device 100 can determine a candidate corrected image in which ringing is suppressed, and thus blur can be corrected accurately.

As described above, the evaluation value calculation unit 205 can, by performing the operation in Equation (5), calculate an evaluation value indicating whether or not there is consistency as a result of the correction of the blur from the captured image and the extent to which the captured image has been corrected to a sharp image while suppressing side-effects such as ringing. In other words, the evaluation value calculation unit 205 can calculate an evaluation value indicating the blur correction level of the candidate correction image, by performing the operation in Equation (5).

Next, the termination judgment unit 206 judges whether or not the series of blur correction processes should be terminated (S204). Here, when the evaluation value calculated by the evaluation value calculation unit 205 becomes smaller than a predetermined threshold, the termination judgment unit 206 judges that an image that is sufficiently blur-corrected has been generated and thus judges that the blur correction should be terminated. Accordingly, in the blur correction device 100, the blur correction can be terminated when a candidate corrected image having a high blur correction level is generated, and thus blur correction can be performed efficiently. It should be noted that the predetermined threshold may be determined in advance based on experimentation, experience, and so on.

It should be noted that the termination judgment unit 206 may judge that the blur correction processing has converged and thus judge that the blur correction should be terminated, in the case to be described later where the difference between the evaluation value prior to blur information updating and the evaluation value after updating becomes smaller than a predetermined threshold. Furthermore, the termination judgment unit 206 may judge that the blur correction should be terminated when the evaluation value calculation is performed a predetermined number of times. It should be noted such predetermined threshold and predetermined number of times may be determined in advance based on experimentation, experience, and so on.

Here, when it is judged that the blur correction should be terminated (Terminate in S204), the termination judgment unit 206 determines, as the corrected image, the candidate corrected image for which the evaluation value indicating the highest blur correction level has been calculated (S206), and terminates the blur correction. Specifically, in the present invention, the termination judgment unit 206 determines, as the corrected image, the candidate corrected image for which the smallest evaluation value E has been calculated. Furthermore, the termination judgment unit 206 outputs the corrected image determined in the above-described manner.

On the other hand, when the termination judgment unit 206 determines that the blur correction should not be terminated (Continue in S204), the blur information updating unit 207 updates the blur information (S206). Then, the blur correction device 100 continues the processing (S202 to S204) so that the optimal corrected image can be obtained.

More specifically, blur information updating unit 207 updates the blur information by perturbing the endpoints of the blur trajectory represented by the line segment group. Although various methods are possible for the endpoint perturbation method, there is a method of perturbing each endpoint 251 by increments of m pixels as shown in FIG. 6.

Figure 6:
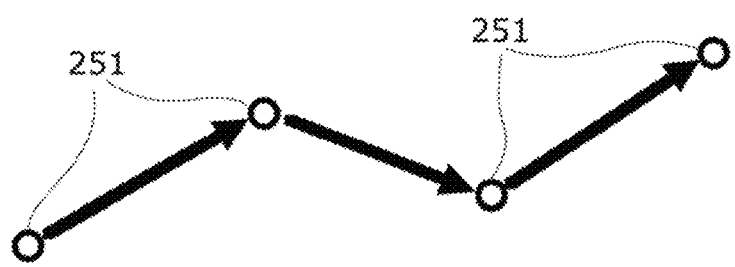
FIG. 6 is a diagram for describing a blur information updating process in Embodiment 1 of the present invention.
Figure 6:
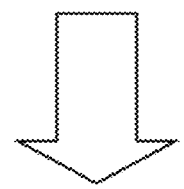
Figure 6:
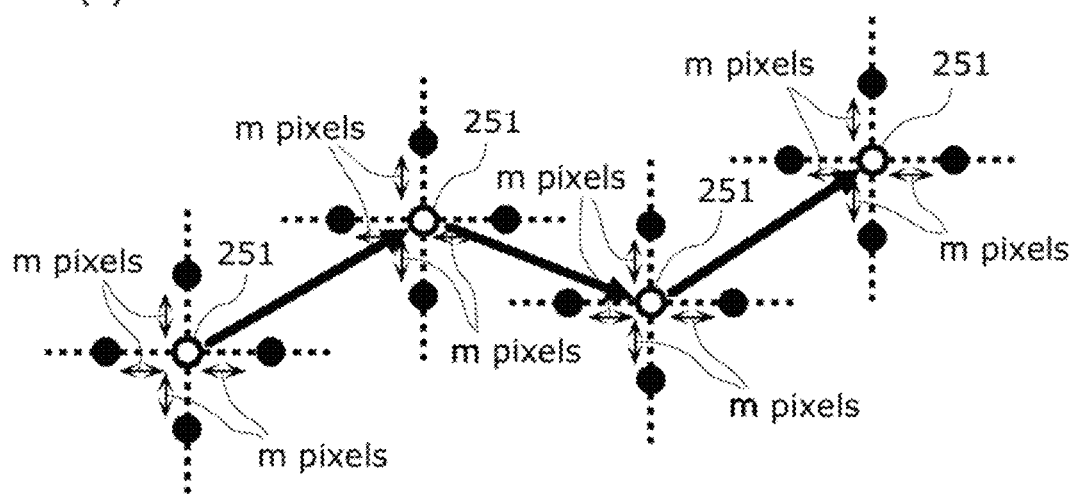

FIG. 6 is a diagram for describing a blur information updating process in Embodiment 1 of the present invention. As shown in FIG. 6, the blur information updating unit 207 updates the blur information by setting the positions obtained from the sensor data as the initial positions of the endpoints 251 of each line segment, and perturbing each of the positions to several positions of an m pixel increment up, down, left, and right, with the initial position as a center. In other words, the blur information updating unit 207 generates, as new blur information, blur information indicating a blur trajectory obtained by connecting the new endpoints perturbed in the above-described manner.

Specifically, the blur information updating unit 207 updates the blur information by changing the position of at least one endpoint of at least one line segment making up the line segment group indicated by the blur information.

Figure 7:
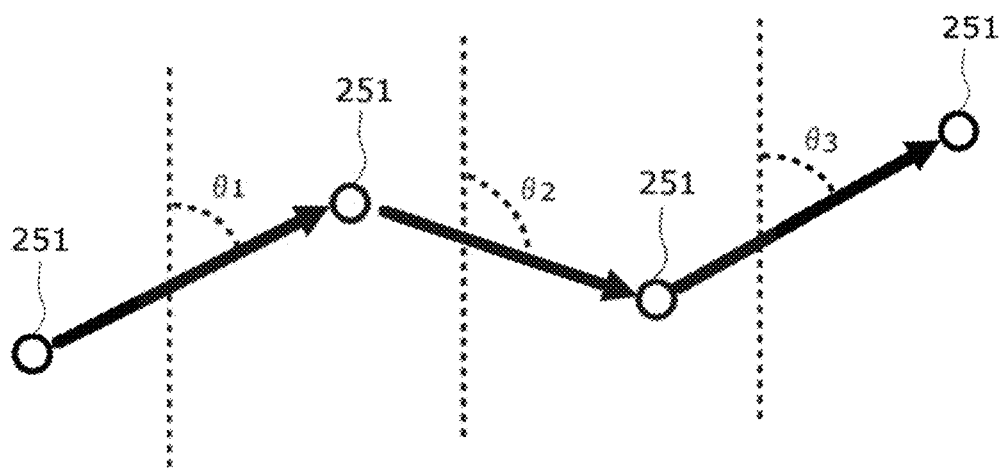
FIG. 7 is a diagram for describing a modification of the blur information updating process in Embodiment 1 of the present invention.

It should be noted that the endpoint perturbation method is not limited to such method. For example, as shown in FIG. 7, the blur information updating unit 207 may update the blur information generated from the angular rate data by finely-changing angles θ1, θ2, θ3, and so on, indicating the direction of the respective line segments into other angles, and then continuously connecting in time-course in order the endpoints 251 of the respective line segments whose angles have been finely-changed It should be noted that with the method of changing the direction of each line segment in the above-described manner, it is eventually possible to obtain the same advantageous effect as the method of perturbing the endpoint positions.

It should be noted that, in the same manner as when the blur information generation unit 203 generates blur information, when the blur trajectory passes through one point multiple times, the blur information updating unit 207 normalizes the value of each point making up the line segment group so that the value of such one point is the total of the values of the points of plural line segments.

Moreover, when the detection accuracy of the motion detection sensor 108 is known in advance, the blur information updating unit 207 may determine the range for the endpoint perturbation according to the detection accuracy. Specifically, the blur information updating unit 207 changes the position of an endpoint within a region having, as a center, the position indicating the image-capturing direction obtained from the sensor data and a size according to the detection capability of the motion detection sensor 108.

With this, the blur information updating unit 207 can avoid performing unnecessary operations caused by perturbing line segment endpoints up to a range that is not possible for the blur trajectory. In addition, inversely, the blur information updating unit 207 can also prevent not being able to perform appropriate blur correction due to a perturbation range that is too narrow. In other words, the blur information updating unit 207 is capable of performing efficient blur information updating.

Furthermore, in the same manner as the blur information generation unit 203, the blur information updating unit 207 may perform an interpolation operation such as spline interpolation so that the blur trajectory becomes smooth.

Furthermore, in the same manner as the blur information generation unit 203, the blur information updating unit 207 can obtain blur information indicating the PSF for when defocusing occurs simultaneously with blurring, by applying the Gaussian filter in Equation (4) to the line segment group representing the blur trajectory obtained by endpoint perturbation. Here, the blur information updating unit 207 may also perform perturbation of the σ in Equation (4) which denotes the degree of defocusing, in the same manner as the endpoints in the blur trajectory. With this, plural candidate corrected images can also be generated for the defocusing, and thus an optimal corrected image can be estimated.

Furthermore, the blur information updating unit 207 may, in changing the endpoint positions, perform the change preferentially towards the direction in which the blur correction level indicated by the evaluation value rises. For example, when the blur correction level indicated by the evaluation value becomes low, the blur information updating unit 207 may change the endpoint positions towards a direction that is different from the previous direction.

As described above, even when a detection error occurs in the sensor data of the angular rate sensor, and so on, the blur correction device 100 in the present embodiment is capable of generating more accurate blur information, by updating the blur information that was generated based on the sensor data. As a result, the blur correction device 100 is capable of accurate blur correction in which side-effects, such as ringing, are suppressed.

Furthermore, with the blur correction device 100, the blur information is represented using a line segment group thereby allowing the blur information to be expressed using a small amount of information as well as facilitating association with the sensor data detected by the motion detection sensor.

Furthermore, the blur correction device 100 is capable of easily updating the blur information by changing the position of an endpoint of a line segment making up the line segment group.

It should be noted that the image correction method and the evaluation value calculation method are not limited to the methods described in the present embodiment and other methods may be used as long as the same advantageous effects can be obtained.

Embodiment 2

Next, Embodiment 2 of the present invention shall be described.

As described above, the blur correction device 100 in Embodiment 1 is capable of accurately correcting blur occurring in a captured image, by updating the blur information generated based on sensor data as necessary.

However, when a PSF indicating the blur occurring during image-capturing has 0 in any of the frequency components, division cannot be performed using such frequency component, and thus the blur correction device will not be able to accurately calculate a corrected image.

Furthermore, even when the frequency component of the PSF is not exactly zero, the effect of quantization error during digital processing increases when the value of the frequency component becomes extremely small. As a result, when the captured image is divided by the PSF on the frequency domain, the error between the sharp image and the corrected image becomes big in a frequency component having the extremely small value, and the blur correction device is likewise unable to obtain a correct correction result. In such a case, it is known that noise called ringing occurs in the corrected image. Hereinafter, a frequency component having a value of zero or an extremely small value out of the PSF shall be called a zero point.

In order to solve this problem, in Non-Patent Literature 2 ("Coded Exposure Photography: Motion Deblurring using Fluttered Shutter", Ramesh Raskar, Amit Agrawal and Jack Tumblin, SIGGRAPH 2006) the exposure period is coded and the PSF is temporally modulated thereby suppressing the occurrence of a zero point, and reducing the occurrence of ringing in the corrected image.

For example, when conventional image-capturing in which the shutter is opened and shut after a certain time-period is performed in the case where blur occurs due to uniform linear motion of a camera, the PSF on the image space assumes a form in which a certain number of values are distributed uniformly over a specific distance in the blur direction. At this time, the PSF on the frequency space is represented by a sinc function, but since the sinc function includes many zero points, a large amount of ringing occurs in the corrected image.

On the other hand, when image-capturing in which the shutter is repeatedly opened and closed to code the exposure period (hereafter called "exposure coding") is performed, the PSF on the image space assumes a form in which fragmentary line segments are distributed. Here, when the optimal cyclic pattern for exposure coding is selected, it is possible to perform correction in which ringing is suppressed, without zero points occurring in all of the frequency components of the PSF.

If such an exposure coding is applied to the method in PTL 1 or PTL 2, it would not be possible to obtain a satisfactory corrected image unless the timing for switching between the opening and closing of the shutter during exposure and the timing for detecting the angular rate using the angular rate sensor are synchronized and the PSF can be accurately estimated.

Furthermore, since the temporal transition of the blur trajectory is not obtained in NPL 1, there is the problem that, when image-capturing is performed by exposure coding, it is difficult to in accurately calculate the PSF in which fragmentary line segments are distributed.

In view of this, Embodiment 2 discloses a method of applying the blur correction method described in Embodiment 1 to the technique described in Non-Patent Literature 2 of coding the exposure period and temporally modulating the PSF. Specifically, the blur correction disclosed in the present embodiment realizes blur correction that is integrated with the coding of the exposure period, by not only calculating the PSF as a spatial distribution, but also calculating the PSF together with the temporal progression information of the PSF.

Hereinafter, a blur correction device 300 in the present embodiment shall be described in detail with reference to FIG. 8 to FIG. 10.

Figure 8:
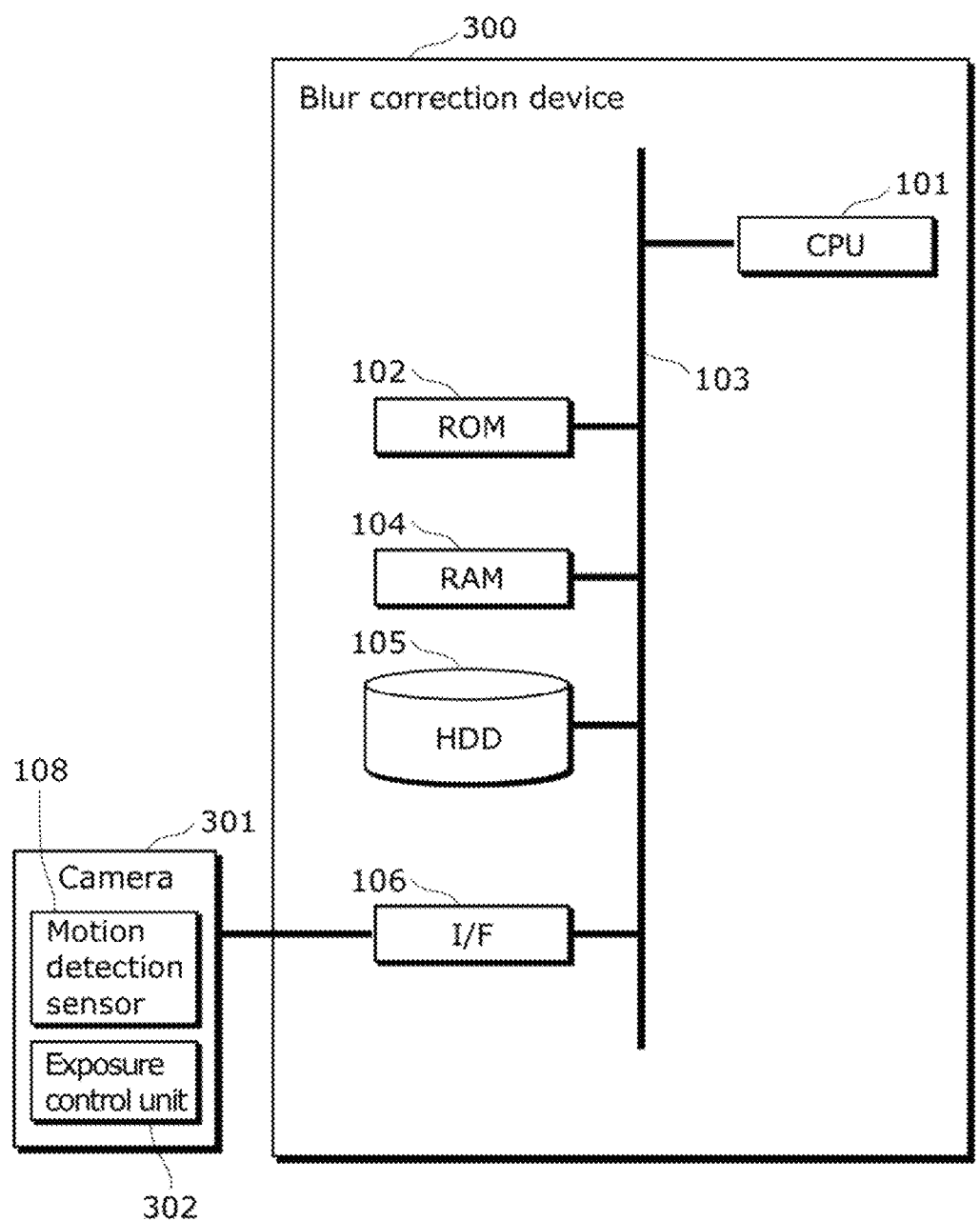
FIG. 8 is a hardware configuration diagram for a blur correction device in Embodiment 2 of the present invention.

FIG. 8 is a hardware configuration diagram of the blur correction device in Embodiment 2 of the present invention. As shown in FIG. 8, the blur correction device 300 in the present embodiment has the same hardware configuration as the blur correction device 100 in Embodiment 1.

It should be noted that, in the present embodiment, the camera 301 includes an exposure control unit 302 in addition to the motion detection sensor 108. The exposure control unit 302 codes the exposure period by creating, during the exposure period, periods in which exposure is actually performed (each referred to hereafter as "exposure ON") and periods in which exposure is not performed (each referred to hereafter as "exposure OFF"). Specifically, for example, the exposure control unit 302 codes the exposure period by opening and closing a liquid crystal shutter placed in front of an imaging device, during the exposure period. Furthermore, for example, the exposure control unit 302 may code the exposure period by opening and closing a mechanical shutter. Alternatively, the exposure control unit 302 may code the exposure period by controlling the timing for reading the electric charge from the imaging device.

In addition, the camera 301 outputs, to the blur correction device 300, the exposure period information regarding the exposure period controlled by the exposure control unit 302, together with the captured image and the sensor data.

Figure 9:
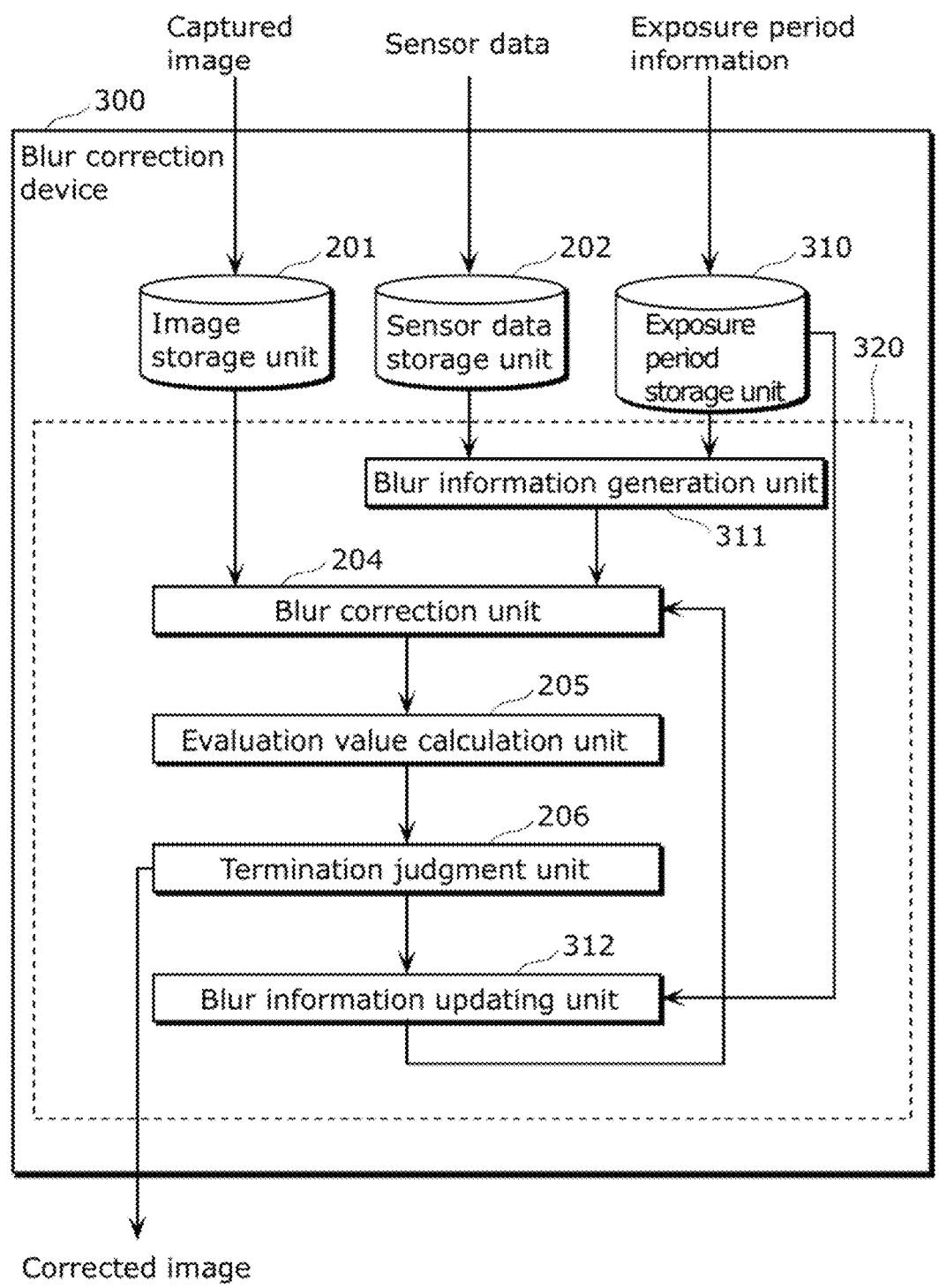
FIG. 9 is a block diagram showing a functional configuration of the blur correction device in Embodiment 2 of the present invention.

FIG. 9 is a block diagram showing the functional configuration of the blur correction device in Embodiment 2 of the present invention. Specifically, FIG. 9 is a block diagram showing the configuration of the functions of the blur correction device which are realized through the hardware configuration shown in FIG. 8. It should be noted that in FIG. 9, the same numerical reference is assigned to constituent elements that are the same as in FIG. 2, and their description shall be omitted accordingly. Furthermore, the flowchart for showing the flow of the blur correction in the present embodiment is the same as the flowchart in FIG. 3, and thus illustration shall be omitted.

The blur correction device 300 includes the image storage unit 201, the sensor data storage unit 202, an exposure period storage unit 310, a blur information generation unit 311, the blur correction unit 204, the evaluation value calculation unit 205, the termination judgment unit 206, and a blur information updating unit 312.

The exposure period storage unit 310 stores exposure period information regarding the exposure ON and exposure OFF. Specifically, the exposure period storage unit 310 stores exposure period information indicating the temporal relationship between the sensor data stored in the sensor data storage unit and the exposure ON and exposure OFF.

The blur information generation unit 311 generates blur information based on the detected angular rate data. Hereinafter, the blur correction information generation process performed by the blur information generation unit 311 shall be described using FIG. 10.

Figure 10:
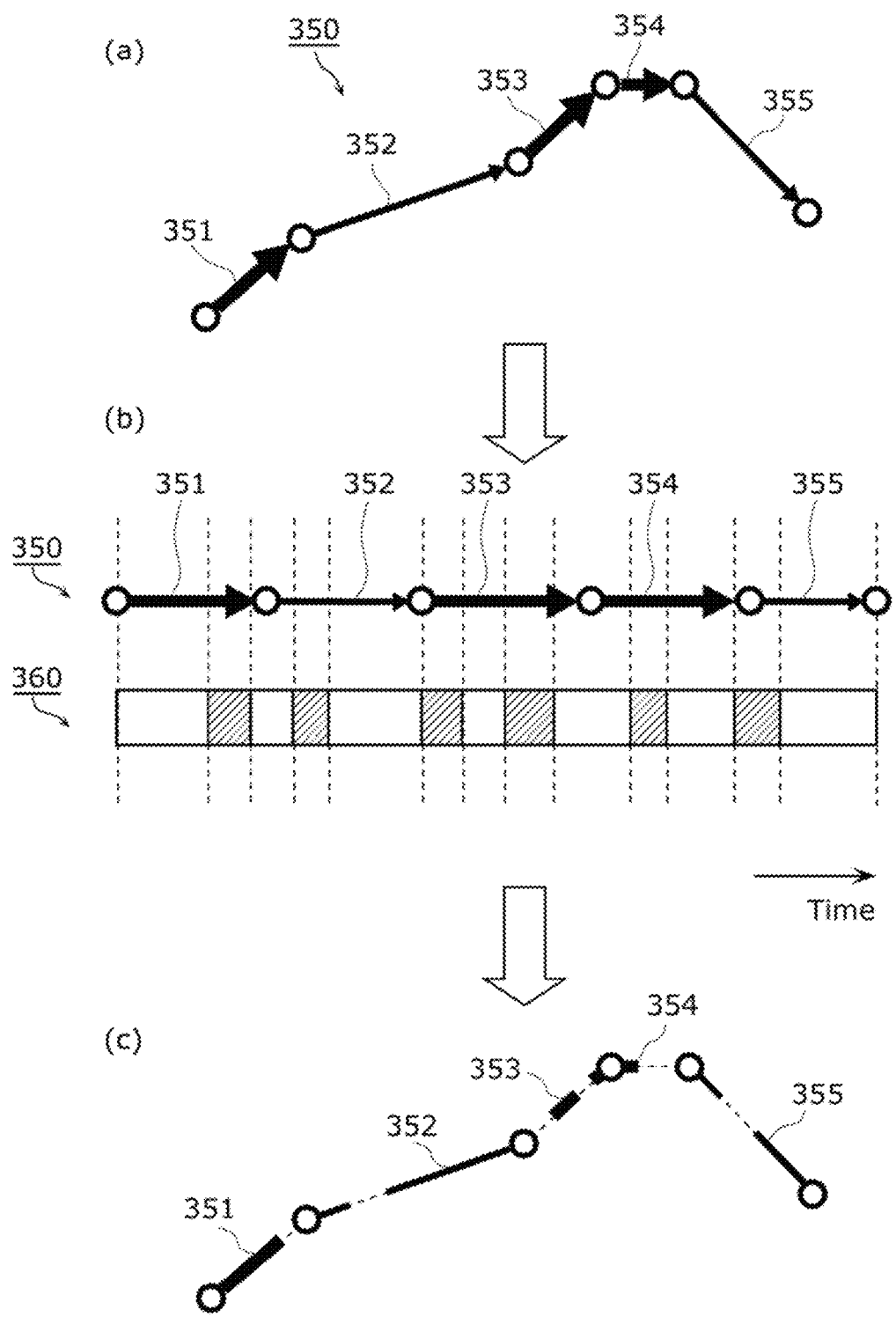
FIG. 10 is a diagram for describing a blur information generation process in Embodiment 2 of the present invention.
Figure 11:
FIG. 11 is a diagram for describing the principle for the occurrence of blur in a captured image and the principle behind a method of correcting blur after image-capturing, through image processing.
Figure 11:
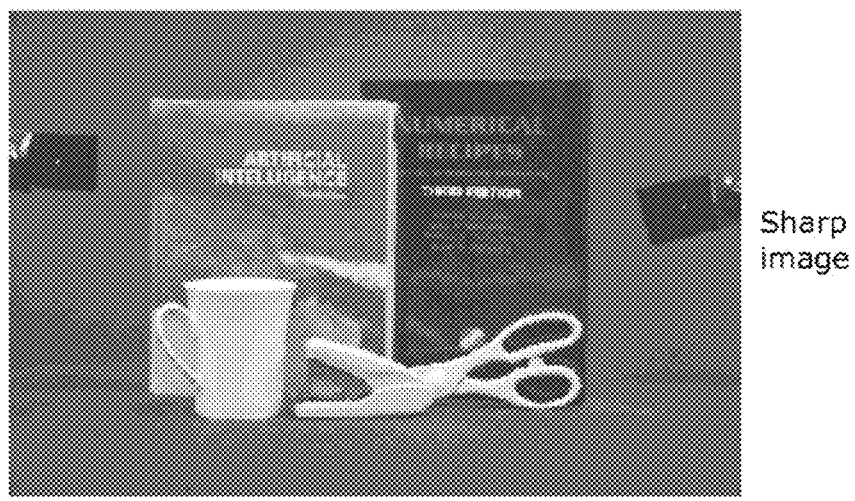
Figure 11:
Figure 11:
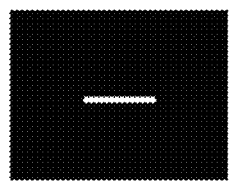

FIG. 10 is a diagram for describing the blur information generation process in Embodiment 2 of the present invention.

In the same manner as in Embodiment 1, in Embodiment 2, the sensor data stored in the sensor data storage unit 202 is assumed to be angular rate data that is sampled for each predetermined time interval T, using an angular rate sensor. At this time, the blur information generation unit 311 can obtain, not only a spatial distribution such as the amount of light collected at the respective pixel positions during the exposure period, but also temporal course information such as the time and the pixel position at which light is collected.

Here, when the direction component is removed from the respective line segments representing the blur trajectory and the time courses of the respective line segments are arranged one-dimensionally, it is possible to recognize, with regard to the course of time, which time corresponds to which position on the line segment, as shown in (a) in FIG. 10. In (a) in FIG. 10, the blur trajectory 350 is represented by the line segment group made up of five line segments (a first line segment 351 to a fifth line segment 355).

On the other hand, exposure period information indicating the timing for switching between exposure ON and OFF, and the periods of the respective exposure ONs and OFFs can be obtained from the exposure control unit 302, a timer, which is not illustrated, and so on, which are included in the camera 301. Therefore, as shown in (b) in FIG. 10, the blur information generation unit 311 can extract exposure ON/OFF periods 360 in synchronization with the blur trajectory 350 in (a) in FIG. 10. Here, in the exposure ON/OFF periods 360 shown in (b) in FIG. 10, a white rectangular region denotes an exposure ON period and a rectangular region marked with slanted lines denotes an exposure OFF period. At this time, the blur occurring in the captured image is only the blur in periods corresponding to the exposure ON and in which exposure is actually performed. Therefore, the blur information generation unit 311 extracts, as valid information, only the blur trajectory in the exposure ON periods, as shown in (c) in FIG. 10. Specifically, the blur information generation unit 311 is capable of generating more accurate blur information by performing masking on the blur trajectory in the exposure OFF periods.

Specifically, the blur information generation unit 311 extracts, in the line segment group in which positions obtained from the sensor data are connected by straight lines, parts indicating the positions while the shutter is open, and generates blur information represented by the extracted parts.

Even in the generation of blur information in such a manner, the blur information generation unit 311 also performs normalization so that the total of the values of the respective points of the line segment group is 1, in the same manner as in Embodiment 1. With this, the blur information generation unit 311 is capable of generating more accurate blur information corresponding to the captured image taken by coding the exposure period. It should be noted that in this case, as in Embodiment 1, the blur information generation unit 311 can generate blur information indicating the PSF when defocusing occurs, by applying a Gaussian filter to the blur trajectory extracted during the valid periods of the exposure ON.

Since the operations of the blur correction unit 204, the evaluation value calculation unit 205, and the termination judgment unit 206 are the same as in Embodiment 1, description shall be omitted below.

Furthermore, after updating the blur information by perturbing the endpoints of the line segment group indicating the blur trajectory prior to taking the exposure ON and OFF periods into consideration, the blur information updating unit 312 updates the blur information by masking the exposure OFF periods in accordance with the coding information of the exposure period, in the same manner as the blur information generation unit 311. Since other operations are the same as those of the blur generation updating unit 207, detailed description of the blur information updating unit 312 shall be omitted.

With this, even in a method of image-capturing by coding the exposure period, the PSF for the actual exposure period can be more accurately calculated and satisfactory blur correction in which ringing is suppressed can be realized.

It should be noted that, instead of a predetermined time interval, the timing at which the angular rate sensor detects the angular rate may be matched to the timing for switching between exposure ON and OFF. In this case, the endpoints of the line segments and the timing for switching between the exposure ON and OFF match, thus simplifying the process.

Although the blur correction device according to an aspect of the present invention has been described thus far based on the embodiments, the present embodiment is not limited to these embodiments. Various modifications to the above-described embodiment and forms constructed by combining constituent elements of different embodiments, that may be conceived by a person of ordinary skill in the art which do not depart from the essence of the present invention are intended to be within the scope of the present invention.

For example, the blur correction device in Embodiment 1 or 2 may be provided in a camera.

Furthermore, part or all of the constituent elements included in the blur correction device in Embodiment 1 or 2 may be configured from a single system LSI (Large Scale Integration). For example, as shown in FIG. 2, a system LSI 220 includes the blur information generation unit 203, the blur correction unit 204, the evaluation value calculation unit 205, the termination judgment unit 206, and the blur information updating unit 207. Furthermore, for example, as shown in FIG. 9, a system LSI 320 includes the blur information generation unit 311, the blur correction unit 204, the evaluation value calculation unit 205, the termination judgment unit 206, and the blur information updating unit 312.

The system LSI is a super multi-function LSI that is manufactured by integrating multiple constituent elements in one chip, and is specifically a computer system which is configured by including a microprocessor, a ROM, a RAM, and so on. A computer program is stored in the RAM. The microprocessor accomplishes its functions through the operation of the microprocessor in accordance with the computer program.

Although a system LSI is mentioned here, the integrated circuit can also be called an IC, an LSI, a super LSI, and an ultra LSI, depending on differences in the degree of integration. Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

It should be noted that the present invention can be in implemented, not only as a blur correction device including the characteristic processing units as described herein, but also as a blur correction method having, as steps, the characteristic, processing units included in such blur correction device. Furthermore, the present invention can also be implemented as a computer program for causing a computer to execute the respective characteristic steps included in the blur correction method. In addition, it goes without saying that such a computer program can be distributed via a computer-readable recording medium such as a CD-ROM and via a communication network such as the Internet.

INDUSTRIAL APPLICABILITY

The blur correction device and the blur correction method according to an aspect of the present invention are capable of accurately correcting blur occurring in an image captured by a camera, to correct the image into a sharp image, and are thus effective for improving picture quality of a digital still camera, and so on.

REFERENCE SIGNS LIST 100, 300 Blur correction device
101 CPU
102 ROM
103 Bus
104 RAM
105 HDD
106 I/F
107, 301 Camera
108 Motion detection sensor
201 Image storage unit
202 Sensor data storage unit
203, 311 Blur information generation unit
204 Blur correction unit
205 Evaluation value calculation unit
206 Termination judgment unit
207, 301 Blur information updating unit
220, 320 System LSI
302 Exposure control unit
310 Exposure period storage unit

The invention claimed is:

1. A blur correction device that electronically corrects blur occurring in an image captured using a camera to generate a corrected image from the captured image, said blur correction device comprising:
   a blur information generation unit configured to generate blur information for correcting the blur occurring in the captured image, based on sensor data indicating motion of the camera, the sensor data being detected using a motion detection sensor during the image-capturing of the captured image;
   a blur correction unit configured to correct the blur occurring in the captured image, based on the blur information generated by said blur information generation unit, to generate a candidate corrected image;
   an evaluation value calculation unit configured to calculate an evaluation value which is an evaluation value for the candidate corrected image generated by said blur correction unit and indicates a blur correction level;
   a termination judgment unit configured to judge whether or not the blur correction should be terminated, based on a predetermined condition; and
   a blur information updating unit configured to update the blur information generated by said blur information generation unit, when said termination judgment unit judges that the blur correction should not be terminated,
   wherein, when the blur information is updated by said blur information updating unit, said blur correction unit is configured to correct the blur occurring in the captured image, based on the updated blur information, to generate a new candidate corrected image, and
   upon judging that the blur correction should be terminated, said termination judgment unit is configured to determine the corrected image from the at least one candidate corrected images generated by said blur correction unit, based on the evaluation value calculated by said evaluation value calculation unit.

2. The blur correction device according to claim 1, wherein the blur information is represented by a line segment group made up of at least one line segment.

3. The blur correction device according to claim 2, wherein said blur information updating unit is configured to update the blur information by changing a position of at least one endpoint of at least one line segment making up the line segment group representing the blur information.

4. The blur correction device according to claim 3, wherein said blur information updating unit is configured to change the position of the endpoint within a region having, as a center, a position obtained from the sensor data and indicating an image-capturing direction and a size according to a detection capability of the motion detection sensor.

5. The blur correction device according to claim 2, wherein the blur information generation unit is configured to generate the blur information represented by the line segment group, by calculating, as a trajectory of the blur, the line segment group in which positions, each of which is obtained from the sensor data and indicates an image-capturing direction at a corresponding one of plural times, are chronologically connected by a straight line, and calculating, as an amount of light, at each point making up the calculated line segment group, a value that is inversely proportional to motion velocity at the position indicating the image-capturing direction.

6. The blur correction device according to claim 5, wherein the camera includes an exposure control unit which controls plural iterations of opening and closing of a shutter during the image-capturing of the captured image, and
said blur information generation unit is further configured to extract parts of the line segment group which indicate positions indicating the image-capturing direction while the shutter is open, and generate the blur information represented by the extracted parts.

7. The blur correction device according to claim 1, wherein said termination judgment unit is configured to judge whether or not the blur correction should be terminated, based on whether or not the evaluation value calculated by said evaluation value calculation unit satisfies a predetermined condition.

8. The blur correction device according to claim 1, wherein said evaluation value calculation unit is configured to calculate the evaluation value such that the blur correction level increases as a sum of difference values between pixel values of neighboring pixels in the candidate corrected image increases.

9. The blur correction device according to claim 1, wherein said evaluation value calculation unit is configured to calculate the evaluation value such that the blur correction level increases as variation in pixel values is kept flat in a region which is in the candidate corrected image and which corresponds to a region in the captured image in which variation in pixel values is flat.

10. The blur correction device according to claim 1, wherein the motion detection sensor is an angular rate sensor.

11. The blur correction device according to claim 1, wherein the blur information indicates a point spread function.

12. The blur correction device according to claim 11, wherein said blur correction unit is configured to convert the captured image and the point spread function indicated by the blur information, from a spatial domain to a frequency domain, divide the captured image by the point spread function after the conversion, and convert a result of the division, from the frequency domain to the spatial domain, to generate the candidate corrected image.

13. An integrated circuit that electronically corrects blur occurring in an image captured using a camera to generate a corrected image from the captured image, said integrated circuit comprising:
   a blur information generation unit configured to generate blur information for correcting the blur occurring in the captured image, based on sensor data indicating motion of the camera, the sensor data being detected using a motion detection sensor during the image-capturing of the captured image;
   a blur correction unit configured to correct the blur occurring in the captured image, based on the blur information generated by said blur information generation unit, to generate a candidate corrected image;
   an evaluation value calculation unit configured to calculate an evaluation value which is an evaluation value for the candidate corrected image generated by said blur correction unit and indicates a blur correction level;
   a termination judgment unit configured to judge whether or not the blur correction should be terminated, based on a predetermined condition; and
   a blur information updating unit configured to update the blur information generated by said blur information generation unit, when said termination judgment unit judges that the blur correction should not be terminated,
   wherein, when the blur information is updated by said blur information updating unit, said blur correction unit is configured to correct the blur occurring in the captured image, based on the updated blur information, to generate a new candidate corrected image, and
   upon judging that the blur correction should be terminated, said termination judgment unit is configured to determine the corrected image from the at least one candidate corrected images generated by said blur correction unit, based on the evaluation value calculated by said evaluation value calculation unit.

14. A blur correction method of electronically correcting blur occurring in an image captured using a camera to generate a corrected image from the captured image, said blur correction method comprising:
   generating blur information for correcting the blur occurring in the captured image, based on sensor data indicating motion of the camera, the sensor data being detected using a motion detection sensor during the image-capturing of the captured image;
   correcting the blur occurring in the captured image, based on the blur information generated in said generating, to generate a candidate corrected image;
   calculating an evaluation value which is an evaluation value for the candidate corrected image generated in said correcting and indicates a blur correction level;
   judging whether or not the blur correction should be terminated, based on a predetermined condition; and
   updating the blur information generated in said generating, when it is judged in said judging that the blur correction should not be terminated,
   wherein in said correcting, when the blur information is updated in said updating, the blur occurring in the captured image is corrected based on the updated blur information to generate a new candidate corrected image, and
   in said judging, when it is judged that the blur correction should be terminated, the corrected image is determined from the at least one candidate corrected images generated in said correcting, based on the evaluation value calculated in said calculating.

15. A non-transitory computer-readable medium having recorded thereon a program for causing a computer to execute the blur correction method according to claim 14.

* * * * *